Aug. 23, 1966 H. G. BOETTGER 3,267,736
CHROMATOGRAPHIC SAMPLING VALVE
Filed Jan. 20, 1964 3 Sheets-Sheet 1
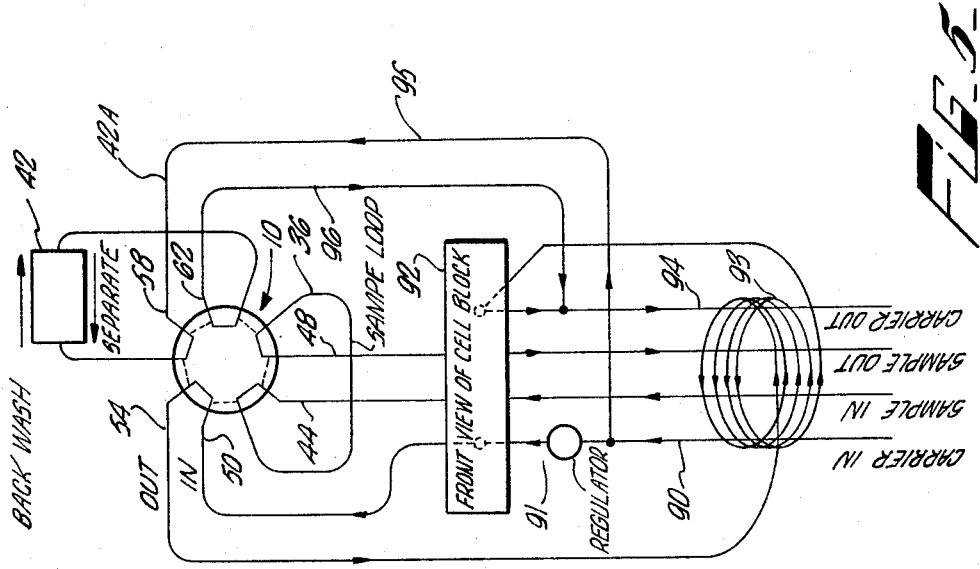
INVENTOR.
HEINZ G. BOETTGER
BY
Christie, Parker + Hale
ATTORNEYS.

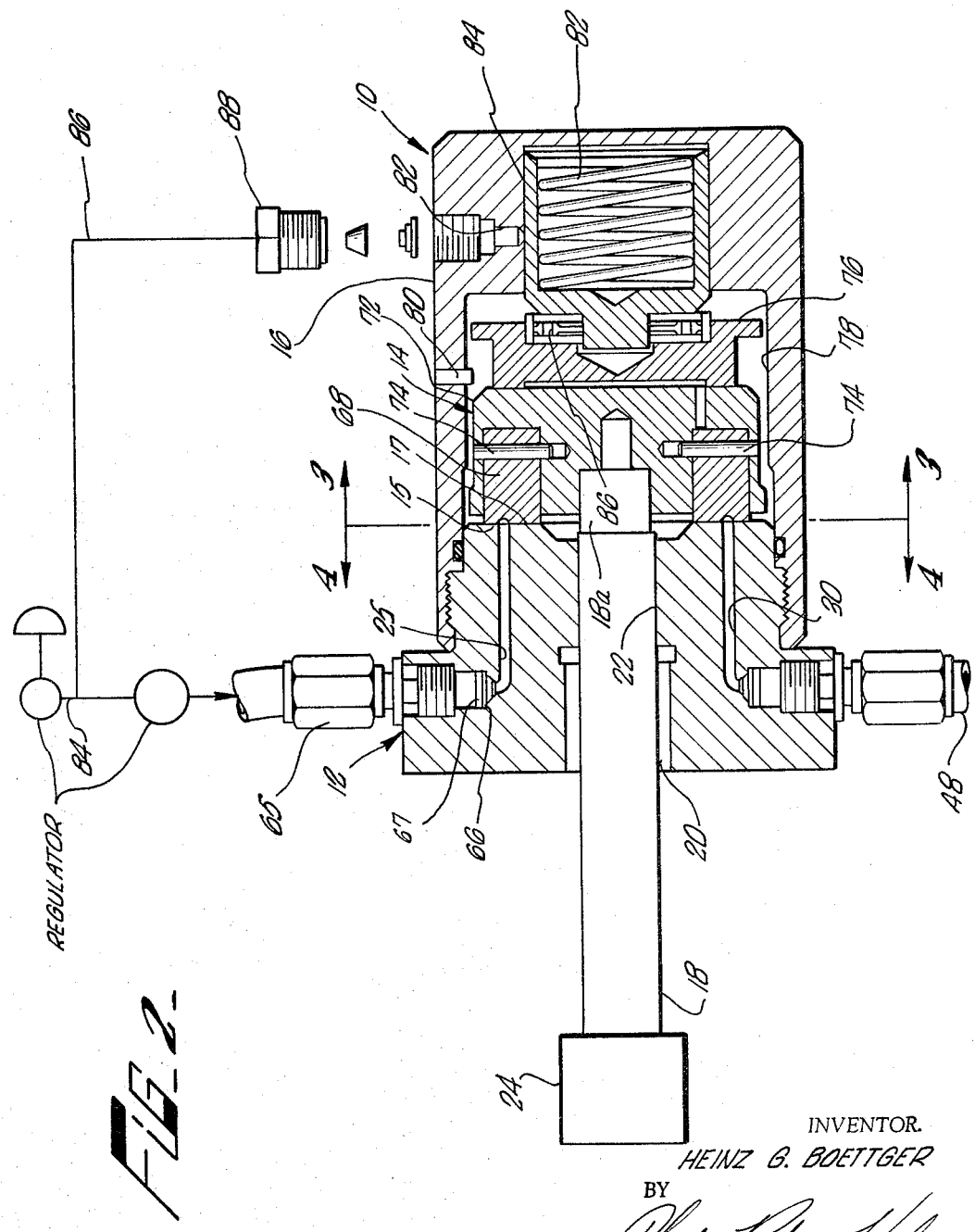

INVENTOR.
HEINZ G. BOETTGER

United States Patent Office 3,267,736
Patented August 23, 1966

3,267,736
CHROMATOGRAPHIC SAMPLING VALVE
Heinz G. Boettger, Tujunga, Calif., assignor to Consolidated Electrodynamics Corporation, Pasadena, Calif.
Filed Jan. 20, 1964, Ser. No. 338,836
6 Claims. (Cl. 73—422)

This invention relates to a sampling apparatus used especially for gas chromatographs for metering a fluid sample from a fluid carrier stream or streams at high temperatures and pressures.

Quite often the mixture analyzed in a gas chromatograph contains both high and low boiling components covering a wide range of boiling point temperatures. In order to separate all components within the chromatographic column, it may require an excessive total analysis time for the high boiling point component to pass through the column. In a great many cases, only the low boiling components are of analytical interest and thus the higher boiling components need not be tested.

Often two chromatographic columns are used in series with the first column acting as a stripping column to separate the light fraction and the second provides a more complete analysis of this fraction. Heavier components are retained in the stripping column while the lighter portions are being analyzed. Typically, the heavier portions are backflushed to atmosphere. This type of operation gives greater efficiency with a lower total analysis time which is of prime interest to many users of gas chromatographic apparatus. The U.S. patent to Marks 2,981,092 describes this type of operation in great detail.

Some gases or liquids being analyzed in chromatographic apparatus may require operation at extremely high temperatures and pressures to first separate the components and secondly to prevent condensation of the lighter components in any part of the apparatus.

It is quite conventional in the type of chromatographic apparatus described above to include a sampling device having a sample chamber of a known volume having an inlet and outlet passages for connection with a fluid carrier stream and a fluid sample stream. A sampling valve is generally used for selectively connecting the sample chamber with either of the fluid streams and for selectively flowing carrier stream through a part of the chromatographic column in either of two directions. The sampling valve has been traditionally a limitation on the type of analysis being conducted having an upper temperature and pressure limit of operability. Control of gas flow into the sample chamber is critical as to volume, temperature, and pressure. Some of the presently used sampling valves typically have a metal to metal sliding contact with a minute amount of lubricant therebetween to aid the switching operation. Valves of this type require frequent lubrication requiring periodic shut down of the analyzer and undesired loss in operating time. More importantly, the lubricant has a tendency to migrate into the sample ports where it may be fractionated causing contamination and tailing of the chromatographic peaks which result in loss of resolution. This lubricant thereby sets the temperature and pressure limits at which the apparatus can be operated and which may be in the range of 200° C. and and 75 p.s.i.g.

In accordance with my invention, I provide a chromatographic sampling valve which is capable of operating at temperatures and pressures greatly in excess of the prior art.

The present valve has a stationary body and a movable valving element engaging the body and having passages therein for selectively connecting the sample chamber with any of the fluid streams which are connected to the stationary body. A means for applying pressure upon the movable valving element is used to urge the valve element against the body and is preferably provided by one of the fluid streams. As the fluid stream pressure varies, the pressure upon the movable valving element changes in accordance with it. A resilient valve element insert, constrained on all sides, is included in the valving element.

In the preferred form of the invention, a piston or load equalizer is positioned above the movable valve element and both are contained within a cap which is fixedly mounted in pressure tight relationship with the stationary body. The cap interior is pressurized with a carrier gas and tends to force the movable valve element against the stationary body and partially balances the pressure on both sides of the movable valve element to prevent leakage at elevated pressures. The resilient element has an insert therein, fabricated from a material filled with glass fibers in a matrix of polytetrafluoroethylene. A cage constrains the insert on all surfaces except the surface abutting the stationary body thereby preventing deformation under high temperatures and pressures. These and other aspects of the invention will be more fully understood from the following detailed description taken in conjunction with the accompanying drawings in which:

FIGURE 1 is a plan view of the sampling valve constructed in accordance with the present invention;

FIGURE 2 is a cross sectional view illustrating the interior of the sampling valve with the section taken along line 2—2 of FIGURE 1 and the schematic illustration of the carrier gas being ducted into the valve to pressurize the rotatable valving element;

FIGURE 3 is a cross sectional view taken along lines 3—3 of FIGURE 2, illustrating the valving surface of the movable valving element;

FIGURE 5 is a schematic flow diagram showing the operation of the present invention as applied to one type of installation and a chromatograph apparatus.

Figure 4:
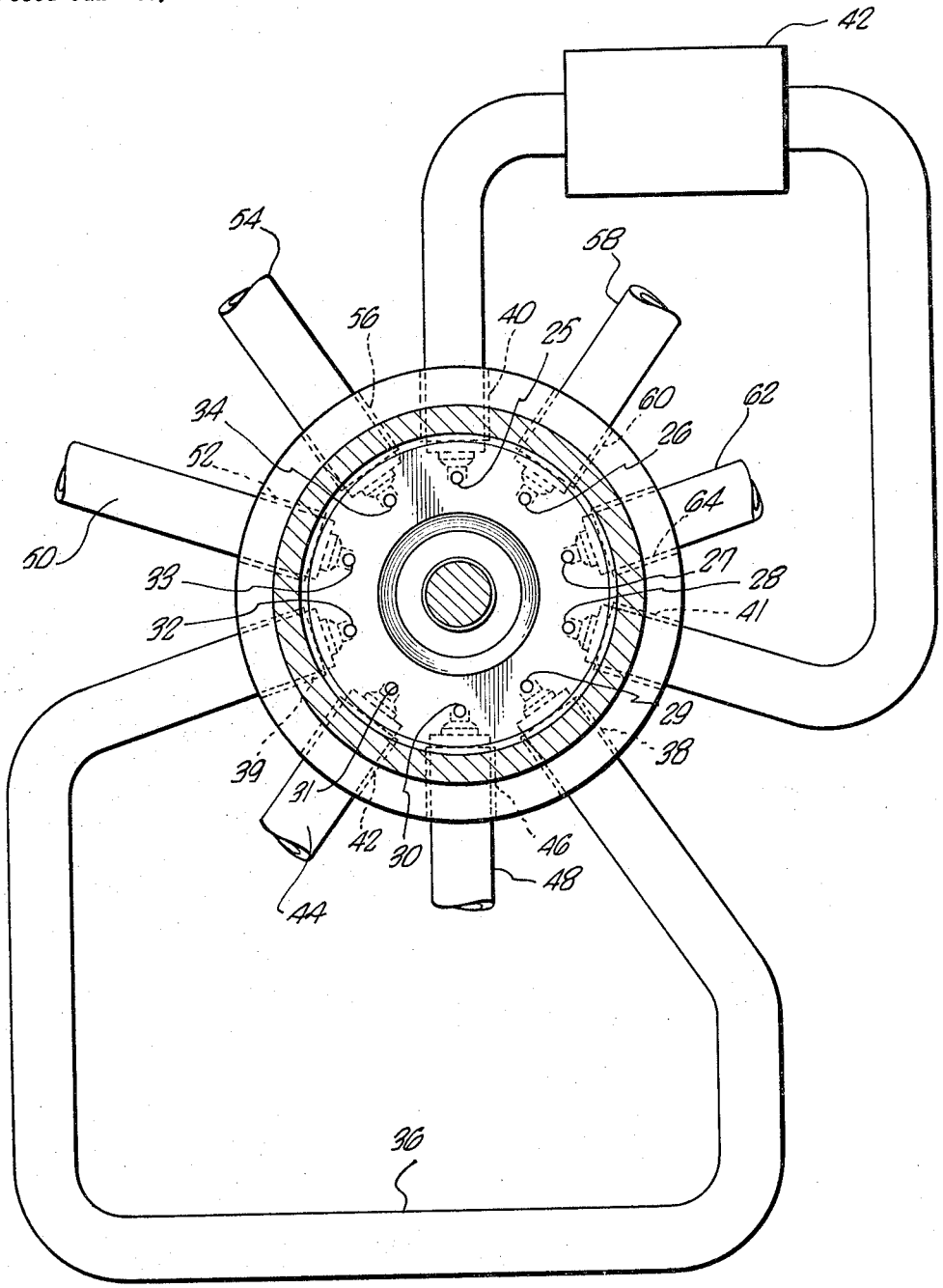
FIGURE 4 is a cross sectional view taken along lines 4—4 of FIGURE 2 and illustrating the ports through which fluid streams pass.

Referring to FIGS. 1–4, the rotary sampling valve 10 comprises a stationary body 12, a rotatable valve element 14, and cap 16. Rotatable valve element 14 has its lower surface 15 disposed for sliding engagement with the top surface 17 of a stationary body 12. Valve element 14 may be rotated with relation to stationary body 12 by the shaft 18 supported on needle bearing 20 and bore 22. Slot 23 formed in the rotatable valve element 14 receives key 18A formed on one extremity of rotatable shaft 18. An actuating device 24 of any suitable type, such as a motor, is attached to the extremity of shaft 18 such that the valve 10 may be operated in a position remote to the apparatus.

Referring to FIGS. 2, 4, and 5, the stationary body has 10 longitudinal bores 25, 26, 27, 28, 29, 30, 31, 32, 33, 34 respectfully opening on surface 17 at 36 inch degree intervals and all disposed on a common circumference of the same diameter. The several longitudinal bores in the body 12 terminate in a common plane in an intermediate portion of the stationary body 12. The inner ends of the longitudinal bores 29 and 32 are respectively connected to the outlet and inlet ends of a sample chamber 36 by radial and outwardly extending lateral bores 38 and 39.

The inner ends of longitudinal bores 25 and 28, in body 12 are connected by radial and outwardly extending bores 40 and 41, respectively, to opposite ends of a short chromatographic column 42. The inner end of longitudinal bore 31 is connected by radial and outwardly extending lateral bore 42 to a sample inlet 44 and the inner end of longitudinal bore 30 is connected by radial and outwardly extending bore 36 to a sample outlet tube 38.

A first carrier inlet tube 50 is connected by radial bore 52 to the inner end of longitudinal bore 33 and a first carrier outlet tube 54 is similarly connected by a bore 56 to the inner end of longitudinal bore 34. A second carrier inlet tube 58 is connected by radial and lateral bore 60 to the inner end of longitudinal bore 26, and a second carrier outlet tube 62 is connected by radial and lateral bore 64 to the inner end of longitudinal bore 27.

A suitable fitting, such as a flare fitting, may be used on any of the tubing to facilitate installation, however the choice is determined by the type of application. A filter 66, and gaskets 68, 67 are interposed within the horizontal bore 60 and retained therein by the fitting 65. Filter 66 is comprised of a sintered micro-screen with a size of 5 microns used to prevent contamination of the valve passages leading to the body surface 17 in the interior of the valve. The fitter specifications is, of course, optional and 5 microns is noted only as conventional.

Referring now to FIGURES 2 and 3, rotatable valve element 14 includes a resilient insert 68 fabricated in the form of an annular ring which is inserted within the closely fitting annulus-shaped opening 70 in cage 72. Insert 68 is locked within cage 72 by plurality of pins 74. It is noted that cage 72 constrains insert 68 and prevents deformation thereof during operation under extremes in temperature and pressure. Insert 68 is fabricated from polytetrafluoroethylene filled with approximately 25 percent by volume with glass fibers and this product is sold commercially by the Fluorocarbon Company of Anaheim, California. The above formulation is set forth as illustrative of an acceptable material and not a limitation to the present invention.

A load equalizer or piston 76 abuts cage 72 and is retained within a cavity 78 formed within cap 16. A plurality of pins 80 extends through cap 16 to retain piston 76 within the cap during assembly. A spring 82 is mounted within a spring cap 84 which is constantly urged against a thrust bearing 86 thereby tending to hold the surface 15 of valve element 14 constantly in engagement with surface 17 of the stationary body 12.

Passageway 82 formed in cap 16 is used to direct carrier gas passing from tubing 84 into line 86 and terminating at fitting 88. The carrier gas enters the interior cavity 78 of cap 16, thus subjecting the rotating valve element 14 to gas pressure. In the preferred embodiments the effective area of the components exposed to gas pressure within cap 16 may be 10 times as large as the effective area exposed to gas pressure of the arcuately shaped slots 90–94 which are formed in insert 68.

Referring to FIGURE 3, a plurality of recesses 90–94 respectively, are formed in the bottom of insert 74 of the rotatable valve element 14 and are positioned on a common circumference at equal intervals of 36°. Longitudinal bores 25–34 terminate on surface 17 of stationary body 12 and are positioned opposite the recesses 90–94 such that the recesses may be selectively connectable as rotatable valve element 14 is actuated by shaft 18.

The operation of the valve in a chromatographic analyzer is shown schematically in FIGURE 5. A stream of carrier fluid, such as helium, flows through a line 90 through a pressure regulator 91, into a thermal analysis cell block 92, which is of the conventional type, and then into the fixed body of the valve 10 through the first carrier inlet tube 50. The first outlet tube 54 is connected to the inlet of a secondary or final chromatographic column 93. The outlet of the secondary column flows back through the analysis cell 92 and then exhausts to the atmosphere through a line 94.

One end of the line 95 is connected to the carrier supply line 90 on the high pressure side of the regulator 91 and supplies fluid to the stationary body of the valve 10 through the secondary inlet tube 58. The second carrier outlet tube 62 is connected by line 96 to line 94 to exhaust to atmosphere.

With the rotatable valve element positioned so that the ports in the fixed body are interconnected as shown by the solid lines in FIG. 5, a first stream of carrier fluid flows through the regulator 91, one portion of the analysis block 92, in the first carrier inlet tube 50, out the second carrier outlet tube 54, through the secondary chromatographic column 93, thereafter through a second portion of the analysis cell 92 and then is exhausted to atmosphere. A second stream of carrier fluid flows through line 95 into the second carrier inlet tube 58, through the short chromatographic column 42 in a reverse direction, and into the fixed body of valve 10 through bore 28, out the second carrier outlet tube 62, and then through line 96 to exhaust through line 94 to the atmosphere.

A sample stream flows through a line 44 into the sample inlet tube, through the sample loop 36, out the sample outlet tube 48, through analysis cell 92 and exhausts to atmosphere.

Carrier gas pressurizes the interior of cap 16 by passing from tube 84 into tube 86, terminating at fitting 88, opening the entire analysis, the carrier gas pressure forces valve element 14 upon stationary body 12 thereby preventing leakage. With carrier gas below and above the valve element 14, obviously the pressure will be equal regardless of the pressure variations.

The sample stream flows through the sample loop 36, one portion of the carrier stream flows through the secondary chromatographic column 42, and a second portion of the carrier stream backwashes the primary column 93. When it is desired to analyze a sample containing a group of components having a relatively long retention time and a group of components having a relatively short retention time, the valve is rotated 36° in a clockwise direction as shown by the arrow in FIG. 4, so that the radial bores of the fixed body are interconnected by the lateral ports of the rotatable body as indicated by the dotted lines. In this new position, a portion of the carrier stream flows in the first carrier inlet tube 50, out the lateral bore, through the sample chamber, through the short column in a forward direction, through the secondary chromatographic column, through the second portion of the analysis cell, and then to the atmosphere.

As soon as the first group of components with the short retention times have passed through the preliminary column, and before any of the second group of components with the long retention times have left the preliminary column, the valve is rotated 36° in a counterclockwise direction, so that the flow of fluids is as previously indicated. The column is backwashed with a stream of carrier fluid, the sample loop is charged with another sample, and a stream of carrier fluid continues to drive the first group of sample components through the secondary column for complete analysis.

I claim:
1. A sampling valve for chromatograph specially adapted for use with high temperature and pressure fluids comprising:
   a cylindrical stationary body having a plurality of inlet and outlet ports,
   a sample chamber connected to one of the body inlet and outlet ports,
   a cage having an annular shaped depression formed therein,
   an annular shaped resilient valve insert having recesses formed therein for selectively interconnecting the body inlet and outlet ports mounted in the cage,
   a cap fixedly mounted upon the body and in gas-tight relation therewith,
   a piston mounted upon the cage and slidable within the cap,
   means for ducting fluid pressure into the cap from a source of one of the fluids for urging the cage into intimate relation with the body, and
   spring means disposed between the cap and the piston for constantly urging the valve insert into engagement with the body.

2. A sampling device as defined in claim 1 and in addition:

means for locking the valve insert into the cage depression, and the valve insert being composed of a polytetrafluoroethylene filled with glass fibers.

3. A sampling device for a gas chromatograph especially adapted for high temperature and high pressure atmospheres comprising:

a stationary body having a plurality of inlet and outlet ports attached to a plurality of fluid streams, a rotatable valve including a resilient insert in the form of an annulus having a plurality of arcuately shaped recesses formed therein and a cylindrical cage having an annular shaped depression formed therein for receiving the insert and constraining the insert in all directions with the exception of the insert surface which abuts the stationary body, the insert being positioned over the inlet and outlet ports for selectively interconnecting the ports, means engaging both the insert and the cage for locking the insert to the cage, a hollow cap fixedly mounted upon the body and in gas-tight relation therewith the cap having a port therein, a piston slidably positioned within the cap and abutting the cage, the piston being located below the port, a thrust bearing mounted upon the piston, a spring guide mounted upon the thrust bearing and having an opening therein, spring means mounted within the spring guide in engagement with the cap and the guide, and means for ducting fluid pressure attached to one of the fluid streams and to the cap port thereby constantly urging the resilient insert into intimate contact with the stationary body.

4. A sampling device for a chromatograph comprising:

a stationary body having a smooth surface and a plurality of passages communicating between the smooth surface and another part of the body, the passages being adapted for connection to different fluid streams at the ends thereof removed from the smooth surface;

a sample chamber of a known volume connected at opposite ends to a pair of the passages;

a cage having an annular recess disposed adjacent the smooth surface of the stationary body;

a resilient valve element located within the annular recess, the valve element having a surface which abuts the smooth surface of the stationary body and a plurality of recesses located in said element surface for selectively interconnecting at least two of the passages in the stationary body;

means for slidably positioning the cage and valve element with respect to the stationary body;

a piston disposed on and bearing against the cage; and means for applying pressure to the piston and the cage for urging the resilient valve element against the stationary body.

5. A sampling device for a chromatograph for use with high temperature and high pressure fluids comprising:

a stationary body having a smooth surface and a plurality of passages communicating between the smooth surface and another part of the body, the passages being adapted for connection to different fluid streams at the ends thereof removed from the smooth surface;

a sample chamber of a known volume connected at opposite ends to a pair of the passages;

a cage having a recess disposed adjacent the smooth surface of the stationary body;

a resilient valve element located with the recess, the valve element having a surface which abuts the smooth surface of the stationary body and a plurality of recesses located in said element surface for selectively interconnecting pairs of passages in the stationary body;

a hollow cap fixedly mounted on the body over the cage, the cap and body forming a pressure tight chamber therein;

means for slidably positioning the cage and valve element with respect to the stationary body;

a piston located within the pressure tight chamber, the piston being disposed on and bearing against the cage; and duct means communicating between one of the fluid streams and the chamber for applying pressure to the piston and the cage for urging the resilient valve element against the stationary body.

6. A sampling device for a chromatograph for use with high temperature and high pressure fluids comprising:

a stationary body having a smooth surface and a plurality of passages communicating at inner ends with the smooth surface and at outer ends with another part of the body, the passages being adapted for connection to different fluid streams at the outer ends;

a sample chamber of a known volume connected at opposite ends thereof to a pair of the passages;

a source of fluid carrier stream connected to one of the passages at the outer end;

a cage having an annular recess disposed adjacent the smooth surface of the stationary body;

an annular resilient valve element located within the annular recess, the valve element having a surface which abuts the smooth surface of the stationary body and a plurality of recesses located in said element surface for selectively interconnecting pairs of passages in the stationary body;

a hollow cap fixedly mounted upon the body over the cage, the cap and body forming a pressure tight chamber therein;

means for slidably positioning the cage and valve element with respect to the stationary body;

a piston located within the pressure tight chamber, the piston being slidably disposed on and bearing against the cage;

spring means disposed between the cap and the piston for biasing the valve insert against the smooth surface of the stationary body; and duct means communicating between the source of fluid carrier stream and the chamber for applying pressure to the piston and the cage for urging the resilient valve element against the stationary body.

References Cited by the Examiner

UNITED STATES PATENTS

| 917,345 | 4/1909 | Nelson | 251—180 X |
|---------|--------|--------|-----------|
| 2,757,541 | 8/1956 | Watson et al. | 73—422 |
| 3,080,759 | 3/1963 | McQuaid | 73—422 |
| 3,160,015 | 12/1964 | Charlton et al. | 73—422 |

LOUIS R. PRINCE, *Primary Examiner.*

S. C. SWISHER, *Assistant Examiner.*